FOOD-PROCESSING BELT

CROSS-REFERENCE TO RELATED PATENT

The subject matter of this application is related in part to the subject matter of the patent of Shinji Kurihara, U.S. Pat. No. 3,396,768, and issued on Aug. 13, 1968.

BACKGROUND OF THE INVENTION

This invention relates generally to a belt for compressing meat-bearing material against a revolving drum, and more particularly, relates to a resilient belt preferably formed from solid polyurethane which enhances the retention of the meat-bearing material into compressibility with the rotary perforated drum of a food-processing apparatus.

The prior art is replete with food-processing devices wherein a rubber belt pushes a ground food against a perforated drum for the purpose of removing some unwanted ingredient from the food mass, such as the skins from the edible starchy portion of potatoes, or as performed in the fish industry, the removal of tuna meat from fish bone. More specifically, in the referred-to cross-reference patent, a rubber belt is utilized for compressing a crushed meat material against a perforated revolving drum to effect separation of meat particles from the small pieces of bone that pervade throughout the material. This particular belt as used in conjunction with this apparatus has been effective in achieving some separation of meat particles from a mass of crushed bone and meat, especially where the crushed meat material derives from animals in the poultry field which generally contain a softer bone structure. The effectiveness of a rubber formed belt achieves its highest efficiency at the initial stages of operation of the apparatus when a new belt is employed, but when the apparatus performs this separating process for any substantial length of time, the sharp edges of the bone particles gradually begin to cut into the surface of the rubber belt, frequently causing shreds or rubber to separate from said belt and enter into the agglomeration of the comminuted meat mass, frequently pressing the shreds of rubber along with the purer meat particles through the drum during the separating process. Obviously this result is not desirable and cannot be tolerated in the segregated meat particles, and cannot comply with food standards regulating the use of such meat for human consumption. More significantly, where the category of animals from which the crushed meat, that is, meat including both meat and bone particles, derives from the red meat field, such as beef from cattle, ham or pork from pigs, lamb from sheep, and so forth, the bone structure of such animals is generally more calcareous and of greater size resulting in a much harder and sharper bone particle when crushed into a meat-bearing material prior to its delivery to the aforesaid meat-separating apparatus. As a result, these sharper bone particles have a tendency to immediately commence cutting and shredding of the rubber belt upon initiation of the meat-separating process, frequently causing this type of a belt to wear out within a relatively short period of time. The deficiencies existing in rubber belts are found to be present in belts manufactured from nylon.

Another deficiency in existing belts utilized in combination with a rotary drum for separating meat from bone is that the meat-bearing material has a tendency to become squeezed laterally and discharge from the cavity formed intermediate the belt and the drum, or the material has a tendency to ride upwardly upon the belt and drum to avoid becoming subjected to the forces of compression thereby evading the entering into compressibility with the drum. The major reason for these two drawbacks is essentially due to the smooth surface present upon existing belts which cannot force movement of the meat intermediate that portion of the belt in near contiguity with the rotary drum, and also because the sides of the belt are not constructed to effect a retention of the meat within the same location. Hence, in the operation of these prior art devices, much of the meat-bearing material becomes wasted and soiled due to its being squeezed laterally from the belt, causing its dropping to the ground. Furthermore, the efficiency of the operation of such apparatuses is significantly reduced since the quantity of material that can be fed to the apparatus diminishes due to this accumulation of meat-bearing material at the entrance into the formed compression cavity.

As a result of the foregoing, it is desirable to provide a resilient belt that overcomes these deficiencies present in the prior art.

It is, therefore, the principal object of this invention to provide a solid polyurethane elastomer molded into a food processing belt which is resistant to shredding and tearing, is of high tensile and elastical strength to effect significant compression of meat-bearing material into contiguity with a revolving perforated drum.

It is another object of this invention to provide a food-processing belt having a roughened surface either through knurling or formed ridges which effectively produces adherence and forced movement of the mass of meat-bearing material when it is transferred intermediate and into compression between the revolving drum and said belt.

It is an additional object of this invention to provide a resilient belt for use in compressing meat-bearing material against a rotating drum wherein said belt is provided with beveled edges that effectively constrain the material against the drum during separation of the purer meat particles from the unwanted ingredients.

It is a further object of this invention to provide an improved food-processing belt for use in conjunction with an apparatus for separating meat from bone, which belt is of enhanced strength, resistant to abrasion and tearing, and generally increases the efficiency and effectiveness in separating meat particles from jagged pieces of bone, tendon, and other undesirable meat byproducts.

A further object of this invention is to provide a resilient polyurethane belt which may be easily installed promptly for usage upon a meat-separating apparatus without requiring constant attention such as necessitated through usage of a rubber, nylon, or similar type belt.

These and other objects of this invention will become more apparent to those skilled in the art in light of the following summary, description of the preferred embodiment, and drawing.

SUMMARY OF THE INVENTION

This invention relates to an improved resilient belt for use in conjunction with food-processing machinery. Food processors, especially those directly concerned with the meat-packing industry, usually have an abundance of animal carcasses remaining after the prime cuts of meat have been removed from the slaughtered animal, or as in the case of poultry, poultry bones containing residue meat generally remain after the packer has removed prime slices from the dressed bird. Ordinarily, these residue-meat-containing bones have been disposed of by giving or selling at a low price to other processors for use in pet foods, or even for fertilizers. With the use of an apparatus such as is disclosed in the cross-referenced patent, these carcasses can now be comminuted or crushed into what may be categorized as a meat-bearing mush or material, and then fed into the apparatus to provide for separation of the remaining meat from the residue of crushed bone and other related animal parts. The crushed particles of bone as fed through this type of an apparatus usually include an abundance of sharp edges which make it difficult to achieve the meat separation step, since the belt arrangement used in combination with a perforated rotary drum is susceptible to cutting and tearing when exposed during the compressive pressures to the jagged edges of the compressed meat bearing material. It has been found that the molding or extruding of resilient belts of this invention from a solid polyurethane mixture of the type which forms an elastomer, when properly cured, greatly enhances the strength and endurance of such belts, and significantly lengthens the operating time of the apparatus. The use of polyurethane in the formation of

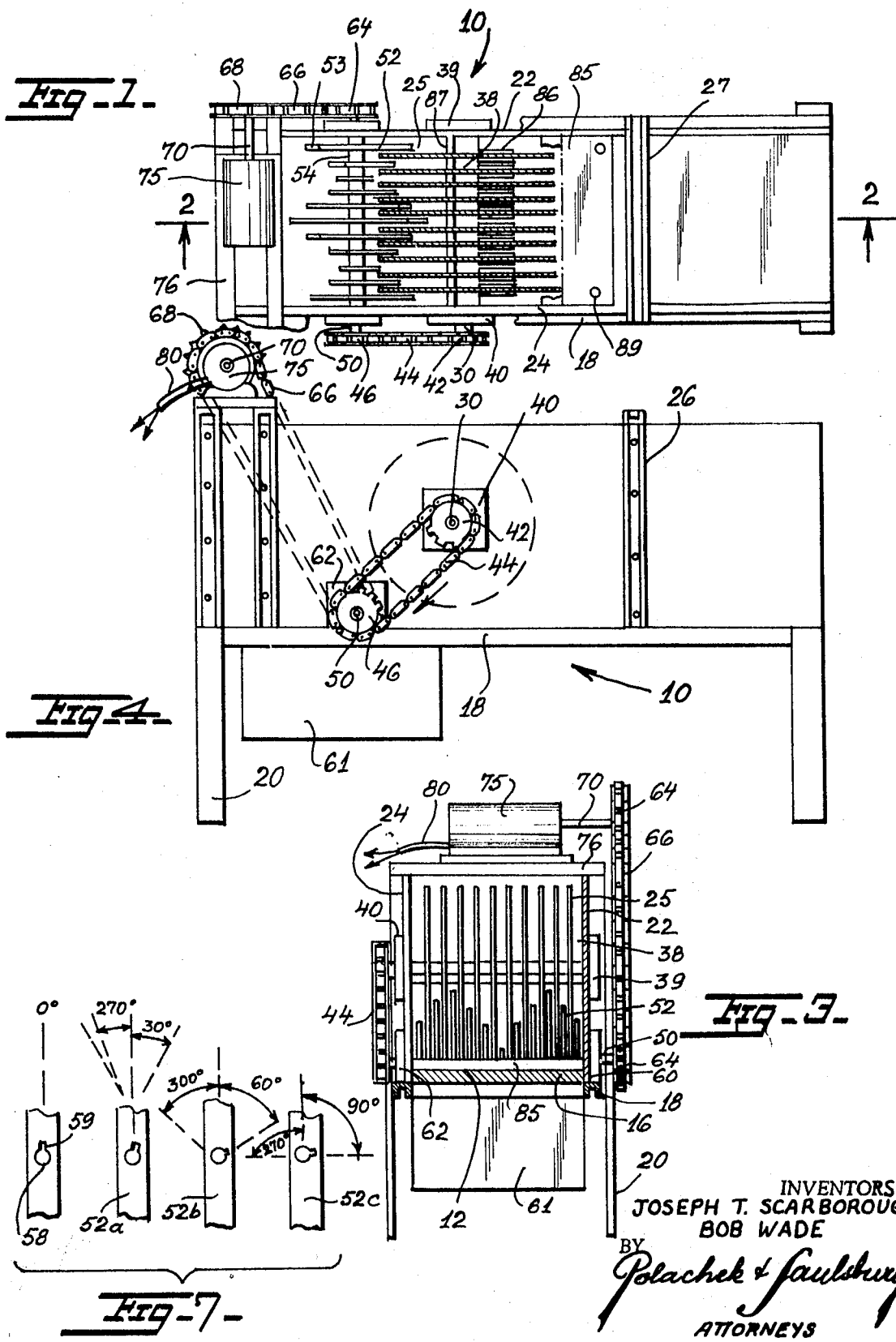

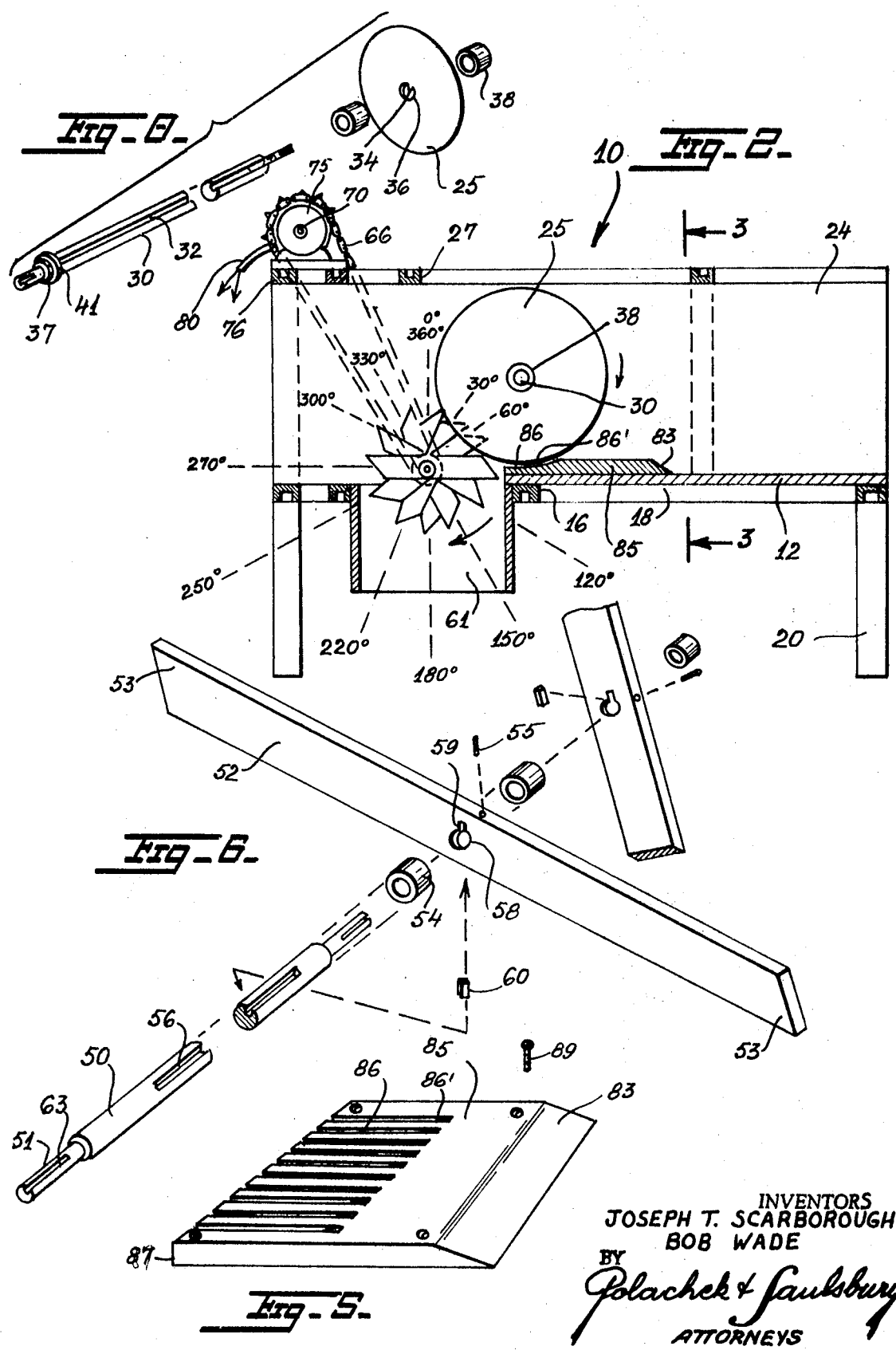

BARBECUED MEAT-CUTTING MACHINE

This invention concerns a cutting machine especially adapted for cutting barbecued or cooked meats.

Conventional meat-slicing machines generally have only one blade and cut a whole slice at a time from a large piece of meat such as ham or beef. Such a meat-slicing machine will not cut through bones and has the further disadvantage that it operates very slowly, since it cuts only one slice at a time. Furthermore, it does not cut slices into chips.

It has been proposed heretofore to provide a meat-cutting machine with a multiplicity of rotary cutting blades. Typical machines of this type are described in U.S. Pat. Nos. 2,241,648 and 2,418,897. They are designed to cut a single slice of meat into narrow strips, one slice at a time. They cannot cut a large piece of meat into slices nor can they cut meat containing bones. A further difficulty encountered in the prior machine is the clogging of the multiple blades by cut pieces of meat. Also they operate too slowly since they cut only one slice at a time.

Where the blades extend through slots or between spaced fingers of a fixed screen to separate chips, the slots and spaces quickly become clogged and no further slices can be fed to the blades until the blades and screen are cleaned.

The present invention is directed at overcoming the above and other difficulties and disadvantages of prior multiple blade food cutting machines. According to the invention there is provided a machine having a multiplicity of axially spaced vertical circular blades having fine teeth and adapted to cut both meat and bone. The bottom edges of the blades extend through a slotted guide plate which clears leading edges of the blades. To the rear of the rotary, circular blades is a plurality of straight chip cutting blades. The straight chipper blades have sharp ends. The chipper blades are mounted on a horizontal shaft and rotate between the rotary circular blades at rear, bottom edges thereof. The chipper blades are angularly spaced apart, with each straight chipper blade spaced about 30° angularly with respect to adjacent blades on opposite sides. The straight chipper blades cut slices into chips as the slices are cut by the circular blades. Then all the cut chips drop into a hopper behind the circular blades and under the chipper blades. A drive motor is operatively connected via chain drives and sprockets to the shafts carrying the circular slicing blades and straight chipper blades. The slotted guide place is supported on a table at the front of the machine over which the meat to be cut is advanced rearwardly to the rotary circular blades. By means of this machine hundreds and even thousands of pounds of barbecued meat can be cut into slices and then into chips, quickly, easily and safely. The blades cut through bone, fat, gristle, and meat with equal facility. Cutting proceeds continuously because the cutting blades are continuously cleared of adhering slices and chips.

The invention is explained in further detail in connection with drawings, wherein:

FIG. 1 is a top plan view of a machine embodying the invention.

FIG. 2 is a vertical sectional view taken on line 2—2 of FIG. 1.

FIG. 3 is another vertical sectional view taken 90° to the view of FIG. 2 on line 3—3 of FIG. 2.

FIG. 4 is a side elevational view of the machine.

FIG. 5 is a perspective view of a meat guide and blade-clearing plate employed in the machine.

FIG. 6 is an enlarged exploded perspective view of parts of an assembly of shaft and straight blades.

FIG. 7 is a plan view of parts of a set of straight blades employed in the machine.

FIG. 8 is an exploded perspective view of a rotary blade, spacers and parts of a supporting shaft.

Referring first to FIGS. 1–4, there is shown the meat-cutting machine 10 comprising a flat horizontal table 12 at the front end of the machine. The table is supported by crossbars 16 of a framework 18 of channel or angle bars mounted on legs 20 at the front and rear of the machine. A pair of spaced vertical panels 22, 24 extend for the full length of the machine. They are supported by sidebars 26 and crossbars 27 of framework 18. Mounted between panels 22, 24 is a set of circular, rotary cutting blades 25. The blades are supported on a horizontal shaft 30 provided with a keyway 32 which engages keys 34 in holes 36 of the blades; see FIG. 8. Cylindrical spacers 38 are disposed between the circular blades. Pressure nuts 37 and washers 41 are placed on opposite ends of the shaft 30 which are journaled in bearing blocks 39, 40 on outer sides of panels 22, 24. Shaft 30 carries a sprocket 42 on which is engaged an endless drive chain 44. The chain is engaged on another sprocket 46 carried by another shaft 50.

Shaft 50 extends across the machine below and behind shaft 30. Shaft 50 carries a multiplicity of straight blades 52 formed with pointed ends 53; see FIG. 6. The straight blades are spaced apart axially by cylindrical spacers 54. The blades are spaced angularly apart circumferentially of shaft 30 as clearly shown in FIG. 2. A preferred spacing is about 30°. Thus the blades are axially oriented in succession from 0° in the vertical direction at angles of 30°, 60°, 90°, 120° . . . 360°, going clockwise as viewed in FIG. 2. The blades 25 and 52 all rotate in the same direction, clockwise as viewed in FIG. 2.

FIGS. 6 and 7 show how orientation of the blades 52 angularly to each other may be accomplished. Shaft 50 has a longitudinally extending keyway slot 56. Each one of blades 52 has a central hole 58 formed with a key notch 59 which is oriented with respect to the longitudinal axis of the blade at an angle of 0°, 30°, 60°, and 90° as shown in FIG. 7. These four orientations are sufficient for all required orientations of the blades 52 on shaft 50. For example, blade 52a shown in FIG. 7, where the key notch is oriented at 30° can be turned around to provide an orientation of 270°. Blade 52b can be turned around to provide a key notch orientation of 300°. Blade 52c can be turned around to provide a key notch orientation of 270°. Since opposite halves of the blades extend in opposite directions, it will be apparent that for each half extending upwardly, there is a corresponding half extending downwardly 180° away. Sharp points 53 are formed at diagonally opposite corners.

A key 60 engages in each notch 58 and in keyway slot 56. Setscrews 55 engage shaft 50. By this arrangement the blades 52 are oriented in angular succession around shaft 50 for the full length of the shaft. The straight chipper blades 52 pass between rear lower portions of the rotary circular blades 25 with point 53 leading. Each chipper blade cuts twice during each rotation as the pointed end cut the slices. Just below blades 25 is a rectangular hopper 61 through which the chips of meat drop from blades 25 and 52.

Outer ends 51 and 55 of shaft 50 are rotatably journaled in bearing blocks 60, 62 at outer sides of panels 22, 24. Sprocket 46 is spaced from panel 22 and engaged on the shaft end 51. This shaft end is formed with a keyway 63 to engage a key of sprocket 42. A sprocket 64 is mounted at the other end of shaft 50.

Chain 66 is engaged on sprocket 64 and on drive sprocket 68 carried by shaft 70 of motor 75. The motor is supported on cross bars 76 of frame 18, and is energized via a power cable 80 from a suitable power supply. By the arrangement described, blades 25 and 52 turn in the same direction, all blades turning clockwise as viewed in FIG. 2.

Mounted on table 12 and extending forwardly of blades 25 is a flat guide plate 85. This plate has a beveled forward edge 83 to permit large pieces of meat to be pushed rearwardly to the blades 25; see FIGS. 2 and 5. The bottom edges of blades 25 extend into parallel slots 86 formed in the top of plate 85. Each slot 86 has a curved forward end portion 86'; see FIG. 2. The slot extends rearwardly under a blade 25 and is open at rear edge 87 of the plate. The plate 85 serves to guide the meat into against blades 25 and the slots serve to clear the blades 25 of any meat particles which may adhere to them. The plate is secured by screws 89 to table 12.

In operation of the machine, barbecued, roasted or cooked meat is pushed over table 12 and up on to plate 85 until the forward edges of the blades 25 engage and cut the meat into slices. The thickness of the slices is determined by the axial lengths of spacers. As the meat is cut and passes rearwardly the rotary straight chipper blades 52 cut the slices into chips. The chips fall through hopper 61 and can be collected in a suitable container (not shown). It is important to note that this machine is both a slicer and a chipper. The chipper blades 52 perform the necessary functions of chipping the slices cut by blades 25 and of clearing the blades 25. The staggered helical arrangement of the chipper blades on shaft 50 has a number of desirable effects. Only one blade 52 at a time is active in chipping the meat. Thus the motor can exert its full driving force for each blade 52 in turn. The strain on shaft 50, the driving sprockets and chains is minimized because only one blade 52 is active at a time. Furthermore, vibration is reduced and smooth operation maximized by the flywheel effect produced by the helical array of blades 52.

The machine can be run continuously to accomplish meat cutting and chipping operations on a large scale. Such operations heretofore have been done by hand or by using a plurality of complicated machines, each performing only one function.

The machine described is relatively inexpensive to manufacture. It will provide, long, satisfactory, trouble-free service. Worn parts can easily be replaced.

What is claimed is:

1. A machine for cutting and chipping barbecued meat, comprising a framework, a table supported by said framework for supporting the meat during cutting; a pair of upright guide panels at opposite sides of the table supported by said framework for retaining the meat on the table; first horizontal shaft rotatably supported above said table; a plurality of vertical, axially spaced, circular cutting blades carried by said shaft and rotatable therewith to cut the meat presented thereto into slices; a second horizontal shaft rotatably supported below and behind the first shaft; and a plurality of sharp, pointed chipping blades mounted radially on the second shaft in axially spaced positions thereon and rotating therewith, said chipping blades rotating between rear, bottom portions of the circular blades to cut said the slices into chips and to clear the spaces between the circular blades.

2. A machine as defined in claim 1, further comprising a flat, horizontal guide plate mounted on the table and extending forwardly of the circular blades to guide the meat thereover for cutting, said plate having a multiplicity of slots therein, lower edges of the circular blades extending into said slots, respectively, so that pieces of meat sticking to the circular blades are cleared and removed at edges of said slots while the circular blades rotate.

3. A machine as defined in claim 1, wherein said chipper blades are straight members angularly spaced apart in succession in a helical array extending along said second shaft, so that only one chipper blade at a time cuts the meat.

4. A machine as defined in claim 1, further comprising a motor carried by said framework; sprockets carried by the first and second shaft and chains entrained on the drive shaft and sprockets so that the circular blades and chipper blades rotate simultaneously in the same direction.

5. A machine as defined in claim 2, further comprising motor drive means carried by said framework and operatively coupled to the first and second shafts to rotate the circular cutter blades and straight chipper blades in the same direction.

6. A machine as defined in claim 5, wherein said chipper blades are straight members, said members being angularly spaced apart in succession in a helical array along said second shaft, the points of the chipper blades being located at diagonally opposite corners of each blade.

7. A machine as defined in claim 6, further comprising a hopper disposed under the chipper blades to guide chips of meat therefrom.

8. A machine as defined in claim 1, further comprising motor drive means carried by said framework and operatively coupled to the first and second shafts to rotate the circular cutter blades and straight chipper blades in the same direction.

9. A machine as defined in claim 1, wherein each of said chipper blades is a straight, flat member with sharp points at diagonally opposite corners and having a central hole formed with a key notch, the key notch in each chipper blade being oriented at an angle with respect to the long edges of the blade which is different from the angle of orientation of the key notch in each adjacent chipper blade; said second shaft having a longitudinal keyway; and keys engaged in said keyway and the key notches of the chipper blades so that the chipper blades are angularly spaced apart in succession in a helical array along said second shaft to enter between the circular blades in succession as the chipper and circular blades rotate so that only one chipper blade at a time cuts the slices cut by the circular blades.

10. A machine as defined in claim 9, further comprising motor drive means carried by said framework and operatively coupled to the first and second shafts to rotate the circular cutter blades and chipper blades in the same direction; and a flat horizontal guide plate mounted on the table and extending forwardly of the circular blades to guide the meat thereover for cutting, said plate having a multiplicity of slots therein, lower edges of the circular blades extending into said slots, respectively, so that pieces of meat sticking to the circular blades are cleared and removed at edges of said slots while the circular blades rotate.